United States Patent [19]

Fujii et al.

[11] Patent Number: 4,728,461

[45] Date of Patent: Mar. 1, 1988

[54] THERMOPLASTIC COMPOSITION OF POLYPHENYLENE ETHER, ETHYLENEMETHACRYLIC ACID COPOLYMER, AND STYRENE-GLYCIDYL METHACRYLATE COPOLYMER

[75] Inventors: Susumu Fujii, Shimodate, Japan; Sai-Pei Ting, Delmar, N.Y.

[73] Assignee: General Electric Company, Selkirk

[21] Appl. No.: 801,731

[22] Filed: Nov. 26, 1985

[51] Int. Cl.⁴ .................... H01B 1/06; C08L 71/04
[52] U.S. Cl. .................................. 252/511; 252/512; 524/504; 524/505; 525/68; 525/92; 525/95; 525/96; 525/905
[58] Field of Search .................. 525/92, 95, 96, 68, 525/905; 252/511, 512; 524/504, 505

[56] References Cited

U.S. PATENT DOCUMENTS

| | | | |
|---|---|---|---|
| 4,166,055 | 8/1979 | Lee | 260/30.6 |
| 4,239,673 | 12/1980 | Lee | 260/30.6 |
| 4,313,864 | 2/1982 | Haaf et al. | 525/92 |
| 4,386,176 | 5/1983 | Fukuda et al. | 525/905 |
| 4,404,125 | 9/1983 | Abolins et al. | 252/512 |
| 4,454,284 | 6/1984 | Uemo et al. | 525/905 |

FOREIGN PATENT DOCUMENTS

| | | |
|---|---|---|
| 0090523 | 10/1983 | European Pat. Off. . |
| 0115216 | 8/1984 | European Pat. Off. . |
| 0260249 | 12/1985 | Japan . |

*Primary Examiner*—Jacob Ziegler
*Attorney, Agent, or Firm*—Hedman, Gibson, Costigan & Hoare

[57] ABSTRACT

Novel polyphenylene ether compositions having good chemical resistance, tensile and impact properties are injection moldable without delamination near the gate. The preferred compositions comprise a polyphenylene ether, a high impact polystyrene, a styrene-ethylene/butylene-styrene copolymer, a poly(ethylene-co-methacrylic acid) and a poly(styrene-co-glycidyl methacrylate), and optionally polyethylene.

14 Claims, No Drawings

THERMOPLASTIC COMPOSITION OF POLYPHENYLENE ETHER, ETHYLENEMETHACRYLIC ACID COPOLYMER, AND STYRENE-GLYCIDYL METHACRYLATE COPOLYMER

BACKGROUND OF THE INVENTION

1. FIELD OF THE INVENTION

This invention relates to compositions of a polyphenylene ether resin, high impact polystyrene, poly (ethylene-co-methacrylic acid), poly(styrene-co-glycidyl methacrylate), and optionally a styrene-ethylene/butylenestyrene block copolymer and polyethylene, which have improved properties.

2. DESCRIPTION OF THE PRIOR ART

The polyphenylene ethers are a family of thermoplastic engineering resins known to be useful with polystyrene resins to form compositions that can be extruded and molded into articles of various shapes and sizes. The resulting products range from parts and housings for household appliances to components for automobiles.

Efforts have been made to combine the polyphenylene ether resin with still other polymers, such as polyethylene, to achieve compositions having property profiles useful for certain specialty applications. Compositions of this type have been described in the patent literature, for example, in U.S. Pat. Nos. 4,166,055 and 4,239,673 (both to Gim F. Lee, Jr.). In general, such compositions are blends of a polyphenylene ether resin, a high impact polystyrene, an elastomeric block copolymer of, e.g., styrene and butadiene, and a polyolefin such as polyethylene. Articles molded from them exhibit better resistance to chemical solvents than conventional blends of polyphenylene ether and high impact polystyrene, which is important for many commercial applications. However, shortcomings include low tensile strengths and a tendency to undergo delamination in the molded part near the gate.

SUMMARY OF THE INVENTION

It is an object of this invention to provide thermoplastic extrusion and molding polyphenylene ether compositions which show good chemical solvent resistance in combination with improved tensile strength and resistance to undergoing delamination.

It is a further object of this invention to provide articles molded from such compositions.

These objects are successfully achieved with the practice of the present invention, which is summarized below.

In essence, it has now been discovered that compositions of polyphenylene ether resin and polyethylene can be modified to replace at least part of the polyethylene with a combination of major amount of an ethylene-methacrylic acid copolymer and a minor amount of a styrene-glycidyl methacrylate copolymer, and to achieve a more homogeneous blend. Further, the resulting blend exhibits significant improvements in the tensile and falling dart impact properties, and greater resistance to undergoing delamination near the gate, without sacrifice to the chemical resistance, in comparison with the same amount of polyethylene alone in the conventional blend.

The property differences in articles prepared from the above mentioned compositions are illustrated in the examples.

DESCRIPTION OF THE INVENTION

Briefly, the present invention is a thermoplastic composition comprising:

(a) a polyphenylene ether resin, alone, or together with one or more alkenyl aromatic polymers; and (b) a minor amount of a combination of (i) a copolymer of ethylene and methacrylic acid and (ii) a copolymer of styrene and glycidyl methacrylate, the combination providing comparable chemical resistance but better moldability than the same amount of polyethylene.

The term "moldability" as used here is defined by the degree of delamination near the gate area of the molded part. The term "better" means less delamination.

The term "minor amount" is used in this disclosure to refer to less than 50 percent by weight, in this case based on 100 percent by weight of components (a) and (b) combined.

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

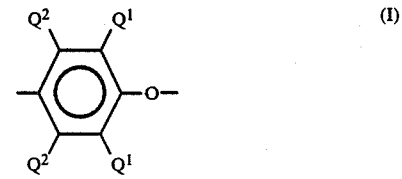

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3-, or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.45 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and α-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

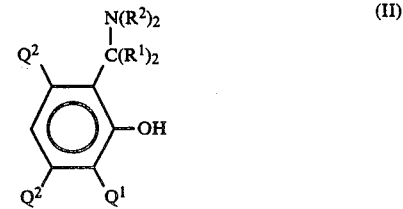

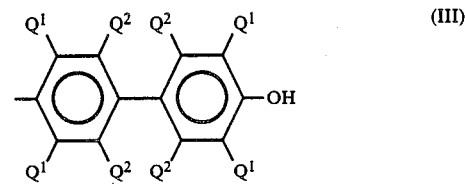

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radical adjacent to the hydroxy group on the terminal unit of the polymer chain. During further processing and/or blending, the aminoalkylsubstituted end groups may undergo various reactions, probably involving a quinone methide-type intermediate of formula IV, below ($R^1$ is defined as above), with beneficial effects often including an increase in impact strength and compatibilization with other blend components.

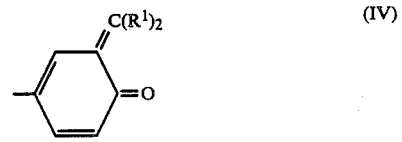

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

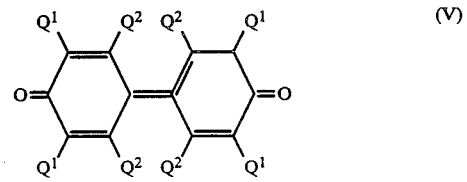

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The polyphenylene ether resin may be used alone, or together with one or more alkenyl aromatic polymers and/or copolymers typically associated with such resins. The alkenyl aromatic polymers useful in the practice of this invention include non-rubber modified poly(alkenyl aromatic) homopolymers, rubber modified poly(alkenyl aromatic) resins, and alkenyl aromatic copolymers and terpolymers, modified or unmodified with rubber.

In general, these alkenyl aromatic polymers, which may be characterized as resins in some cases and rubbers in other cases, are derived in whole or in part from alkenyl aromatic compounds having the formula

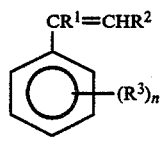

where $R^1$ and $R^2$ are selected from the group consisting of lower alkyl and alkenyl groups having from 1 to 6 carbon atoms, and hydrogen; each $R^3$ is selected independently from the group consisting of hydrogen, chloro, bromo, and lower alkyl groups having from 1 to 6 carbon atoms; and n represents the total number of $R^3$ substituents on the ring, the same or different, and is an integer from 1 to 5.

Compounds within the above formula include, but are not limited to, styrene, alpha-methyl styrene, para-methyl styrene, 2,4-dimethyl styrene, chlorostyrenes (mono-, di-, tri-, etc.), para-tert-butyl styrene, paraethyl styrene, and the like.

Most preferred for this invention is polystyrene, including unmodified and rubber modified polystyrene resins, as well as copolymers of styrene with one or more other monomer, such as butadiene. These may be used singly or in combination in the parent compositions.

The rubber modified polystyrene resins suitable to use herein include those commonly referred to in the art as high impact polystyrenes, or HIPS. Typically, these are derived by adding rubber during or after the polymerization of the styrene monomer, to give a mixture, interpolymer, or both, depending on the procedure. Examples of suitable rubber modifiers include polybutadiene, polyisoprene, polychloroprene, ethylene-propylene-diene (EPDM) rubber, ethylene-propylene copolymers(EPR), polyurethanes, and polyorganosiloxanes (silicone rubbers or elastomers). Any of these is permissible in the context of this invention.

Also useful are thermoplastic linear, graft and radial block copolymers of styrene with other monomers, and especially with rubbery precursors, such as butadiene. These include various types in which one or more polymeric styrene units alternate or vary randomly with one or more other polymeric units, e.g., polybutadiene, or in which the polystyrene has been grafted onto a rubbery backbone polymer. Most especially, these will be materials which serve as impact strength improvers to upgrade this property in articles prepared from the compositions. Suitable commercial materials include various Kraton ® rubbers manufactured by Shell Chemical Company and the Stereon ® products of FIRESTONE Co.

The polyphenylene ether resins and poly(alkenyl aromatics), including mixtures of two or more alkenyl aromatic polymers, are utilizable in the present compositions in virtually all proportions, for instance, from 99:1 to 1:99 parts by weight ratio based on 100 parts by weight of these two types of polymers combined.

The polymer which constitutes component (b)(i) of the present compositions is essentially a random copolymer containing both ethylene units and methyl acrylic (methacrylic) acids units in the polymer chain. More specifically, the copolymer is characterized by units of the following formulae:

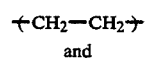

and

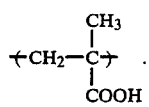

Preferably, this copolymer will have a methacrylic acid content in the range of 5 to 40 percent by weight.

These copolymers may be prepared by conventional methods, such as by the reaction of ethylene with methacrylic acid in an organic solvent, for example, benzene, in the presence of a free radical generating compound, for example, benzoyl peroxide. The reaction may be carried out at the boiling point of the solvent, with refluxing, and if desired at superatmospheric pressures to further facilitate the copolymerization.

Random copolymers of ethylene and methacrylic acid suitable for use in the practice of this invention are also available commercially from The DuPont Company, under the trade designation Nucrel resins.

The polymer which constitutes component (b)(ii) of the present compositions, serving in combination with (b)(i) is a copolymer of styrene and glycidyl methacrylate characterized by units of the following formulae:

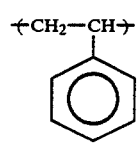

and

-continued

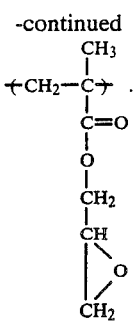

Preferably, this copolymer will have a glycidyl methacrylate content in the range of 5 to 50 percent by weight.

Preparation of such copolymers is similar to that of styrene-methyl methacrylate copolymer formation, except of course for the use of glycidyl methacrylate as a comonomer in place of methyl methacrylate. Thus, for instance, glycidyl methacrylate is polymerized alone or with an alkyl acrylate, for example, butyl acrylate, followed by polymerization of styrene monomer in the presence of the glycidyl methacrylate polymer or copolymer.

Typically, copolymer (b)(ii) will contain less than 50 percent by weight of glycidyl methacrylate units and, correspondingly, greater than 50 percent by weight of styrene units.

Preferred embodiments of the present invention will be formulated to be within certain favored ranges of material amounts which are as follows:

| Ingredients | Amount, Parts by Weight |
| --- | --- |
| Polyphenylene ether resin | 95 to 5 |
| High impact polystyrene resin | 5 to 95 |
| | 100 Total |
| Styrene-ethylene/butylene-styrene block copolymer | 1 to 20 |
| Ethylene-methacrylic acid copolymer | 1 to 40 |
| Styrene-glycidyl methacrylate copolymer | 0.1 to 10 |
| per each 100 parts of the above two resins combined. | |

In most cases, effective results are obtained with the use of just very small amounts of component (b)(ii), and typically the composition of the invention will contain a major amount of (b)(i) and a minor amount of (b)(ii), relative to one another.

As mentioned, polyethylene, while not necessary, can be included in the composition if desired. Only relatively small amounts are contemplated and, in general, the amount used should be low enough such that the total weight of the polyethylene combined with components (b)(i) and (b)(ii) does not exceed 40 parts by weight, per 100 parts by weight of (a) and (b).

The present compositions are often formulated to also contain supplementary ingredients, including those which beneficially affect chemical and physical properties of the compositions during and after molding. These are generally selected from among additives or auxiliary materials, both polymeric and non-polymeric, which are conventionally employed in polyphenylene ether resin compositions. Among them are mineral fillers (for example, clay, mica or talc), reinforcing agents or fillers (for example, glass fibers, flakes or spheres), plasticizers, lubricants, antioxidants, stabilizers, colorants (for example, dyes or pigments), flame retardant agents, electrically conductive materials (for example, carbon blacks), melt viscosity reducers, and so forth. Typically, these materials are utilized in conventional amounts for achieving their known functions, usually varying from about 1 to about 50 parts by weight, based on 100 parts by weight of the total composition.

For applications where greater fire resistance is desired, one or more flame retardant agents may be added in the usual amounts. Of particular current interest are bromine compounds and higher molecular weight brominated or bromine-containing flame retardant agents, such as bromostyrene oligomers or polymers, both homopolymeric and copolymeric. They may be supplemented with known flame retardant synergists, for example, antimony oxide, in small amounts.

The composition is prepared by any conventional method, and normally by dry or solution blending the ingredients to form a homogeneous mixture. For greater convenience, it is often advantageous to form the mixture into pellets or tablets, and this can be done by extruding the mixture and thereafter cutting or chopping the extrudate down to size. The pellets or tablets can then be injection molded into the desired article, including any of those for which polyphenylene ether resin compositions are known to be useful.

DESCRIPTION OF THE SPECIFIC EMBODIMENTS

The compositions and articles of this invention are further illustrated in the following examples, which are provided to show best or preferred embodiments.

EXAMPLES 1–5

The compositions shown in Table 1 were prepared by forming a preblend of the ingredients at room temperature, extruding the preblend through a twin-screw 28mm Werner-Pfleiderer extruder at 290 rpm using the temperature profile 350/450/500/550/550/550° F., and injection molding into test pieces using a 3 ounce Newbury injection molding machine under a pressure of 10,000 psi, a melt temperature of 545° F. and a mold temperature of 150° F. A prior art comparison is included. The results are shown in the Table 1.

It is clear that replacement of the low density polyethylene in the comparison blends by poly(ethylene-co-methacrylic acid) and poly(styrene-coglycidyl methacrylate) results in significant improvements in the Dynatup impact strength, the tensile strength, the elongation, and the resistance to delamination near the gate, without notable sacrifice in the chemical resistance (Examples 5 and 6). The blend compositions comprising the combination of low density polyethylene, poly(ethylene-co-methacrylic acid) and poly(styrene-coglycidyl methacrylate), Examples 1, 2 and 3, also exhibit improved performance over the comparison blend. However, their resistances to delamination near the gate are not as good as Examples 5 and 6.

TABLE 1

|  | A* | B** | 1 | 2 | 3 | 4 | 5 |
|---|---|---|---|---|---|---|---|
| Compositions | | | | | | | |
| Ingredients, Parts by Weight | | | | | | | |
| Poly(2,6-dimethyl-1,4-phenylene ether)resin (PPO ®, General Electric Co., I.V. 0.47 dl./g. in chloroform at 25° C.) | 47 | 47 | 47 | 47 | 47 | 47 | 47 |
| High Impact polystyrene resin (FG 834, American Hoechst Co.) | 30 | 30 | 30 | 30 | 30 | 30 | 30 |
| Styrene-ethylene/butylene-styrene block copolymer (KG 1651, Shell Chemical Co., a hydrogenated derivative of styrene-butadiene-styrene block copolymer) | 8 | 8 | 8 | 8 | 8 | 8 | 8 |
| Low density polyethylene (MN-722, U.S.I.) | 15 | 15 | 10 | 7.5 | 5 | — | — |
| Ethylene-methacrylic acid copolymer (Nucrel ® 403, DuPont Co., containing about 10% by wt. of methacrylic acid) | — | — | 5 | 7.5 | 10 | 15 | 15 |
| Styrene-glycidyl methacrylate copolymer (GS-20, Nippon Oils and Fats Co., containing about 26% by wt. of glycidyl methacrylate) | — | 1 | 1 | 1 | 1 | 1 | 2 |

All blends contained 1.5 parts by weight of mineral oil, 0.5 part by weight of tridecyl phosphite, 0.15 part by weight of zinc sulfide and 0.15 part by weight of zinc oxide.

| Properties | | | | | | | |
|---|---|---|---|---|---|---|---|
| Heat deflection temperature, °F. | 247 | 237 | 248 | 241 | 246 | 251 | 248 |
| Notched Izod impact strength, ft.lb/in. | 11.5 | 11.2 | 10.5 | 11.5 | 12.2 | 11.9 | 10.9 |
| Dynatup falling dart impact strength, in.lb. | 243 | 226 | 290 | 312 | 328 | 303 | 340 |
| Tensile yield strength, psi | 6300 | 6200 | 6800 | 6900 | 7100 | 7000 | 7000 |
| Tensile strength at break, psi | 6200 | 6200 | 7100 | 7700 | 7900 | 8000 | 8200 |
| Tensile elongation, % | 29 | 30 | 80 | 107 | 106 | 104 | 110 |
| Flow channel length, in. | 16½ | 16½ | 12½ | 11½ | 11 | 11 | 9 |
| Chemical resistance: | | | | | | | |
| 0% | 89 | 87 | 84 | 82 | 91 | 83 | |
| ½% | 81 | 82 | 78 | 77 | 76 | 75 | 71 |
| 1% | 84 | 85 | 82 | 81 | 59 | 71 | 44 |
| 2% | 42 | 43 | 0 | 0 | 0 | 0 | 0 |
| delamination near gate | yes | yes | yes | yes | yes | No | No |

*control and prior art comparison composition
**comparison composition
Chemical resistances were compared by the retention of the tensile yield strength value after immersing the test specimens in brake fluid at 185° F. for 3 days.

The invention may be modified from the particular embodiments shown without departing from the scope and principles and without sacrificing the chief benefits.

We claim:

1. A thermoplastic composition comprising
   (a) a polyphenylene ether resin hydrogenated block copolymer of styrene and butadiene or a combination of the polyphenylene ether resin, the hydrogenated block copolymer of styrene and butadiene with one or more alkenyl aromatic polymers; and
   (b) less than 50 percent by weight, based upon 100 percent by weight of (a) and (b) combined of a combination of (i) a copolymer of ethylene and methacrylic acid and (ii) a copolymer of styrene and glycidyl methacrylate.

2. The composition of claim 1, in which the polyphenylene ether is a homopolymer or copolymer having the formula

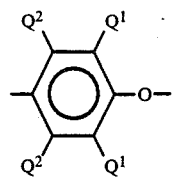

in which in each of these units independently each $Q^1$ is selected from hydrogen, halogen, primary or secondary lower alkyl containing up to 7 carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently selected from hydrogen, halogen, primary or secondary lower alkyl, phenyl, haloalkyl, hydrocarbonoxy or halocarbonoxy as defined for $Q^1$.

3. The composition of claim 2, in which the polyphenylene ether resin is poly(2,6-dimethyl-1,4-phenylene ether) resin.

4. The composition of claim 2, in which the polyphenylene ether resin is poly(2,6-dimethyl-co-2,3,6-trimethyl-1,4-phenylene ether) resin.

5. The composition of claim 1, wherein the one or more alkenyl aromatic polymers selected from the group consisting of nonrubber-modified poly(alkenyl aromatic) homopolymers, rubber-modified poly(alkenyl aromatic) resins, rubber-modified alkenyl aromatic copolymers, non rubber-modified alkenyl aromatic copolymers, rubber-modified alkenyl aromatic terpolymers and non rubber-modified alkenyl aromatic terpolymers.

6. The composition of claim 5, in which the alkenyl aromatic polymers are derived in whole or in part from an alkenyl aromatic compound having the formula

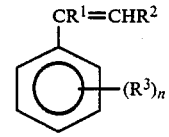

in which $R^1$ and $R^2$ are selected from the group consisting of lower alkyl groups having from 1 to 6 carbon atoms, lower alkenyl groups having from 1 to 6 carbon atoms, and hydrogen; each $R^3$ is selected independently from the group consisting of hydrogen, chloro, bromo, and lower alkyl groups having from 1 to 6 carbon atoms; and n represents the total number of $R^3$ substituents on the ring and is an integer from 1 to 5.

7. The composition of claim 6, in which the compound from which the alkenyl aromatic polymers are derived is styrene.

8. The composition of claim 1, in which component (a) comprises the polyphenylene ether resin, a rubber modified high impact polystyrene resin, and the hydrogenated block copolymer of styrene and butadiene.

9. The composition of claim 1, in which the methacrylic acid content in the copolymer (b)(i) is in range of 5 to 40 percent by weight.

10. The composition of claim 1, in which glycidyl methacrylate content in the copolymer (b)(i) is in the range of 5 to 50 percent by weight.

11. The composition of claim 1, in which component (b) comprises a major amount of (b)(i) and a minor amount of (b)(ii), based on the total amount of (b).

12. The composition of claim 1, which includes one or more additional ingredients selected from the group consisting of mineral fillers, glass reinforcing agents, plasticizers, lubricants, antioxidants, stabilizers, colorants, flame retardant agents, electrically conductive materials, and melt viscosity reducers.

13. The composition of claim 1, which includes from 1 to 20 parts by weight of a styrene-ethylene/butylene-styrene copolymer, from 1 to 40 parts by weight of an ethylene-methacrylic acid copolymer and from 0.1 to 10 parts by weight of a styrene-glycidyl methacrylate copolymer based on 100 parts by weight of the polyphenylene ether resin and rubber modified, high impact polystyrene combined.

14. The composition of claim 13, which also includes polyethylene in an amount from zero to an amount such that the total amount of the polyethylene combined with the ethylene-methacrylic acid copolymer and the styrene-glycidyl methacrylate copolymer does not exceed 40 parts by weight per 100 parts by weight of the polyphenylene ether resin and rubber-modified high impact polystyrene combined.

* * * * *